Dec. 19, 1933.  W. A. MARRISON  1,940,599
TEMPERATURE CONTROLLING DEVICE
Filed May 17, 1928
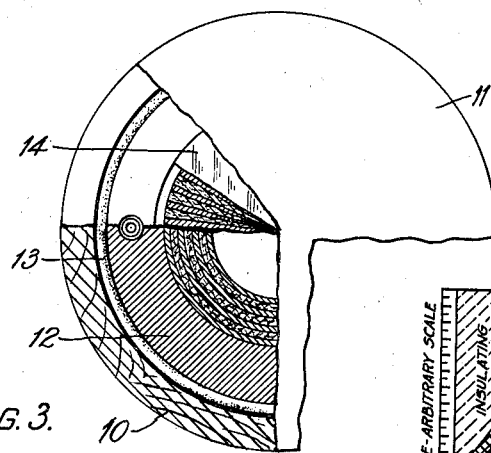
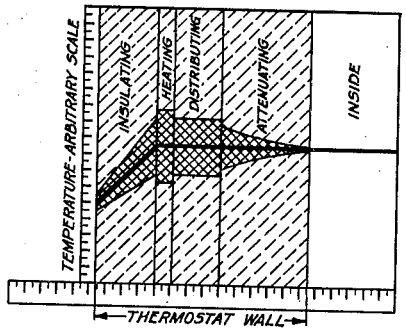
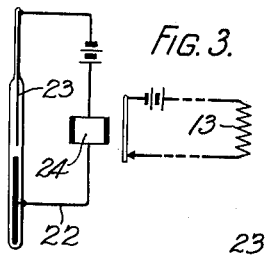
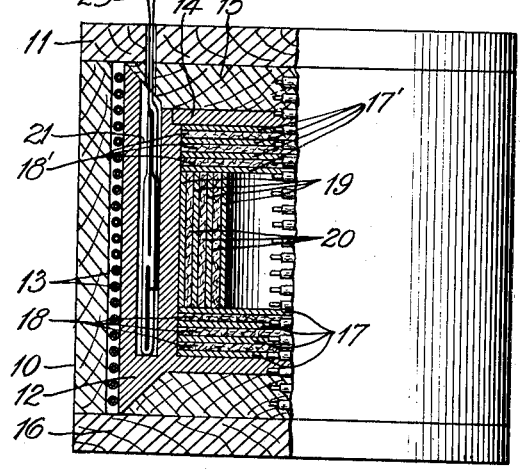
INVENTOR:
WARREN A. MARRISON
BY Irving MacDonald
ATTORNEY Patented Dec. 19, 1933

1,940,599

UNITED STATES PATENT OFFICE 1,940,599

TEMPERATURE CONTROLLING DEVICE

Warren A. Marrison, Orange, N. J., assignor to Bell Telephone Laboratories, Incorporated, New York, N. Y., a corporation of New York Application May 17, 1928. Serial No. 278,570

8 Claims. (Cl. 219—19)

This invention relates to temperature controlling devices in general, and more specifically to heat controlling devices of a type used for maintaining certain standard frequency determining apparatus at a constant temperature.

This device is particularly well adapted for use in picture transmission systems wherein the senders and receivers must be maintained accurately in phase with respect to each other through the operation of the frequency determining apparatus, such apparatus being greatly affected by temperature changes in the container in which it is enclosed.

The object of this invention is to provide a heated container wherein the temperature may be maintained constant irrespective of relatively great temperature differences outside of the container casing.

According to this invention the container is formed by a plurality of interfitting casings of different materials having different thermal characteristics. A temperature responsive element which may be of the mercury type is placed in the wall of a metallic casing and is adapted to control the current flow in the heater element which in turn is placed between the metallic casing and the outermost disposed casing which is made of wood. The metallic casing, in the wall of which the temperature responsive element is mounted, is made of aluminum which has good heat conducting characteristics with the added advantage of being of low specific gravity. Within the aluminum casing is placed a series of alternately disposed walls or partitions of felt and copper which form a heat attenuating layer whereby the temperature variations in the region of the metallic casing caused by the switching of the current in the heating element are attenuated to such a degree that the temperature in the inner container remains substantially constant. The whole thus cooperates to form a temperature controlling device which prevents the large ambient temperature variations from affecting the controlled enclosure, and also those variations that necessarily occur due to the operation of the responsive element.

Other features and advantages of the invention will appear from the following description and by the claims appended thereto, reference being had to the accompanying drawing in which:

Fig. 1 is a top view of the container showing the covers and casings with portions cut away;

Fig. 2 is an elevation of the container partly in section;

Fig. 3 is a diagrammatic view of a circuit suitable for controlling the current flow in the heating element used in this container; and Fig. 4 is a graph showing the heat propagation through the different layers.

Referring to the drawing, 10 is a wooden casing having a cover 11. A cup-shaped member 12, which may be of aluminum or other similar good heat conducting material, is disposed concentric with respect to casing 10, and a heating element 13 is mounted in the circular space between the wooden casing 10 and member 12 as shown in Figs. 1 and 2. Member 12 is provided with an aluminum cover 14 which has substantially the same thickness as the bottom wall thereof and is arranged to fit in the countersunk top portion as shown. Member 12 is provided at each end portion with tapered depressions in which the conical wooden blocks 15 and 16 are disposed.

In the bottom of member 12 there is placed in a pile-up arrangement a plurality of discs of non-similar material, such as discs 17 and 18 shown in Fig. 2. Discs 17 are preferably made of good conducting material such as copper having small heat storing capacity and the discs 18 of felt or any other similar insulating material.

In member 12 there is disposed a plurality of concentric partitions 19 which, like the discs 17, may be made of copper and partitions 20 made of felt.

In the space between the top portions of partitions 19 and 20 and the underside of aluminum cover 14 there is placed in a pile-up arrangement a plurality of copper discs 17' and a number of intermediate felt discs 18'.

The wall of aluminum member 12 which is comparatively thick has a chamber 21 which extends preferably from a point lying in a plane with the bottom of member 12 and in it there is disposed a heat responsive device in the form of a mercury filled Pyrex tube to which the contact wires 22 and 23 are sealed. Contact 22 is disposed in contacting relation with the mercury, and contact wire 23, which is preferably of tungsten, is separated by a relatively short distance from the top of the mercury column as shown in Fig. 3. The expansion and contraction of the mercury column due to changes of temperature is effective to control the energization of electromagnet 24, which in turn, controls the flow of current in the coil 13 in an obvious manner.

In the operation of this heat controlling device and as illustrated in Fig. 4, the wooden casing 10 prevents excessive loss of heat, while the heating element 13 supplies the heat necessary. The aluminum member 12 distributes the heat and by means of the heat responding element and associated apparatus controls the average temperature. The copper and felt partitions serve further to distribute the heat and act like a filter to reduce temperature variations existing in the region of the heat responding element.

What is claimed is:

1. A heat controlling device comprising a heat insulating casing, a metallic casing within said heating insulating casing, a heating element disposed around said metallic casing, means in the wall of the last-mentioned casing for regulating the heating effect of said heating element, said metallic casing forming a chamber, and a plurality of metallic and non-metallic partitions interposed in said chamber in heat attenuating relation with the last-mentioned casing.

2. A heat controlling device comprising a plurality of concentrically disposed casings including a metallic casing having relatively thick walls, a heating element for supplying heat to said metallic casing, heat responsive means in a chamber in said metallic casing for controlling the heat supplied by said heating element and a barrier of alternate layers of metallic and heat insulating material located inside of the metallic casing for controlling the conduction of heat toward a chamber formed by the layer innermost disposed in said casing.

3. A temperature control device comprising a uniformly distributed electric heating coil, a layer of heat insulating material enclosing the same to prevent excessive loss of heat therefrom, a layer of good heat conducting material having small heat storing capacity located adjacent said coil and having a chamber therein, heat responsive means in said chamber for controlling the heating effect of said heating coil, said last mentioned layer serving to distribute the heat and cooperating with the heat responsive means to control the average temperature, and alternate layers of poorly conducting and good conducting materials located within said last mentioned layer and serving further to distribute the heat and attenuate temperature variations that exist at the heat responsive element.

4. A temperature controlling container for a device to be protected from temperature variations, characterized in this, that said container comprises a number of interfitting casings of different thermal characteristics, the outer being of wood which prevents excessive loss of heat, the next casing being of aluminum which serves to distribute the heat, alternate layers of copper and felt being located inside the aluminum casing and serving also to distribute the heat and attenuate temperature variations.

5. Temperature regulating means comprising an oven having walls composed of alternate layers of heat conducting and heat insulating material, heating means surrounding said alternate layers, a thermostatic means connected with said heating means, and means under the control of said thermostatic means for controlling said heating means.

6. A constant temperature device comprising an oven whose walls comprise a plurality of layers of good conducting material alternating with a plurality of layers of poor conducting material and constitute a thermal attenuator, a layer of heat distributing material surrounding said walls, and means for applying heat to said distributing layer.

7. Temperature regulating means comprising an oven whose walls comprise a plurality of layers of good conducting material alternating with a plurality of layers of poor conducting material and constitute a thermal attenuator, a layer of heat conducting material surrounding said walls, and a temperature responsive means within said layer, for controlling the supply of heat to said oven.

8. A constant temperature device comprising an insulating container, a heating coil within said container, a layer of heat conducting material surrounded by said heating coil, a chamber within said layer, temperature responsive means within said chamber for regulating the heating effect of said heating coil in accordance with the temperature to which said means is subjected, and a thermal attenuator consisting of alternate layers of heat conducting and heat insulating material within said layer.

WARREN A. MARRISON.